Patented Oct. 3, 1950

2,524,368

UNITED STATES PATENT OFFICE 2,524,368

PLASTICIZERS FOR VINYL RESINS

George R. Sido, Springfield, Mass., assignor to Monsanto Chemical Company, St. Louis, Mo., a corporation of Delaware No Drawing. Application December 31, 1947, Serial No. 795,131

7 Claims. (Cl. 260—30.8)

This invention relates to vinylidene polymer and copolymer compositions. More particularly, the invention relates to new plasticizers for vinylidene polymer and copolymer resins.

Vinylidene polymer and copolymer resins are among the most important of the modern plastics. They are normally thermoplastic resins which may be molded into a variety of shapes and forms in a multitude of colors. For many uses the resins must be modified with a plasticizer or softener to obtain the exact properties desired. This qualification has been a sore spot in the industry for a long time since the known plasticizers are inadequate for one reason or another. For example, many plasticizers materially lower the water resistance of the resins. Others are volatile even at normal temperatures which results in a gradual hardening and embrittlement of the articles made therefrom. Still others lose their plasticizing properties at low temperatures which prevail in the winter time or at high altitudes. None of the known plasticizers are free from one or more of these and other deficiencies.

One object of this invention is to provide new vinylidene polymer and copolymer compositions.

A further object is to provide new plasticizers for vinylidene polymer and copolymer resins.

These and other objects are attained by plasticizing vinylidene polymer and copolymer resins with ethers of alkylol derivatives of aryl sulfonamides.

The following examples are given in illustration and are not intended as limitations on the scope of this invention. Where parts are mentioned, they are parts by weight.

Example I 100 parts of vinyl chloride polymer were dissolved in cyclohexanone to obtain a 10% solution by weight. To this solution were added 20 parts of the 2-ethyl hexyl ether of methylol p-toluene sulfonamide. After thorough mixing, the solution was cast onto a glass plate and the solvent was removed by heating the cast film at about 125° C. for about 30 minutes. The resultant film was clear, transparent, colorless and tough. It was more flexible than a film cast from a similar solution containing no plasticizer. The plasticized film could be heated for a relatively long time at 125° C. without any substantial loss of plasticizer or change in color of the resin.

Example I was repeated except that the proportion of plasticizer was increased to 40, 60, 80 and 100 parts in separate experiments. All of the films obtained were clear and colorless and differed one from another only in the flexibility of the films which increased with increasing amount of plasticizer. The films still retained their flexibility at 0° C.

Example II 5 solutions, each containing 100 parts of polymerized vinyl chloride dissolved in cyclohexanone were prepared. To each solution the lauryl ether of methylol p-toluene sulfonamide was added but in different proportions. 20, 40, 60, 80 and 100 parts of plasticizer were used in the respective solutions. Films cast from these solutions were clear, colorless and tough. Their flexibility increased with increasing amount of plasticizer and it was only slightly affected by lowering the temperature of the films to 0° C. There was substantially no loss of plasticizer on prolonged heating at 125° C. and substantially no gain in color.

Example III 100 parts of vinyl chloride polymer were mixed dry with 50 parts of the 2-ethyl hexyl ether of methylol p-toluene sulfonamide. The dry mixture was milled on hot rolls until a homogeneous sheet was obtained. The milling properties of the mixture were much improved over those of unplasticized polyvinyl chloride or of polyvinyl chloride plasticized with conventional plasticizers like dioctyl phthalate and tricresyl phosphate. The sheets obtained were clear, colorless, tough and flexible and the color of the resin was not impaired by the milling operation.

Example IV 100 parts of a copolymer of vinyl chloride and diethyl maleate prepared from 90 parts of vinyl chloride and 10 parts of diethyl maleate were mixed dry with 50 parts of the 2-ethyl hexyl ether of methylol p-toluene sulfonamide. The mixture was milled on hot rolls to obtain clear, colorless, tough and flexible sheets. The composition also had improved milling properties.

Similar sheets were made from copolymers of vinyl chloride with ethyl acrylate, acrylonitrile, vinyl acetate and vinylidene chloride in each of which the vinyl chloride constituted about 90% by weight of the copolymer. In each case the plasticized composition exhibited improved milling characteristics and the sheets were clear, colorless, tough and flexible.

Example V 100 parts of a copolymer of vinylidene chloride and vinyl chloride in which the vinylidene chloride constituted 90% by weight of the copolymer were mixed dry with 50 parts of the butyl ether of methylol p-toluene sulfonamide. The mixture was hot milled to obtain flexible sheets which were clear and colorless.

Polymerized styrene and copolymers of styrene with fumaronitrile, ethyl acrylate and alpha methyl styrene were all plasticized with the lauryl ether of methylol p-toluene sulfonamide condensation product to yield flexible products which did not lose plasticizer on aging even at elevated temperatures. Particularly valuable were the polystyrene compositions since the plasticizers did not materially affect the high moisture resistance of these resins.

*Example VI*

100 parts of a polyvinyl butyral resin were mixed dry with 35 parts of the butyl ether of methylol p-toluene sulfonamide. The mixture was extruded through a conventional worm type extruder to obtain a transparent sheet about .015" thick. The sheet was laminated between glass plates and tested for use as safety glass in automobile windshields. The laminated glass showed a balanced impact strength, excellent adhesion even at relatively high moisture contents and did not develop any objectionable color on aging.

The resins which may be plasticized according to this invention are vinylidene polymers and copolymers and derivatives thereof. Among the vinylidene compounds which may be used are the vinyl halides including vinyl fluoride, vinyl chloride, etc., vinylidene halides such as vinylidene fluoride, vinylidene chloride, vinylidene bromide, 1-chloro-1-fluoro ethylene, etc., vinyl esters such as vinyl acetate, vinyl formate, vinyl chloracetate, vinyl propionate, vinyl butyrate, vinyl laurate, vinyl stearate, etc., derivatives of acrylic and alpha substituted acrylic acids such as their esters, nitriles, amides and imides including the methyl, ethyl, propyl, butyl, lauryl, stearyl, etc., esters of acrylic and methacrylic acid, and the esters, nitriles and amides of the alpha, beta unsaturated dicarboxylic acids including the esters, nitriles and amides of maleic, itaconic, citraconic, mesaconic, methylene malonic, etc., acids.

The plasticizers of this invention are the reaction products of alkylol derivatives of aryl sulfonamides. These compounds are new and are disclosed and claimed in my copending application S. N. 776,627, filed September 27, 1947. They are prepared by reacting an alcohol with an alkylol derivative of an aryl sulfonamide. The latter derivatives may be prepared by reacting an aryl sulfonamide such as benzene sulfonamide and its ring-substituted derivatives with aldehydes under alkaline conditions, with a chlorhydrin followed by removal of hydrogen chloride or by other well known means for forming alkylol compounds. The resulting products range from viscous liquids to waxy solids. They are substantially insoluble in water, relatively non-volatile and substantially colorless. They are compatible in all proportions with vinylidene polymers and copolymers. In very small proportions such as from .05 to about 5 parts per 100 parts of resin they act as heat stabilizers for such unstable compounds as vinyl chloride polymers and copolymers.

The new plasticizers are particularly valuable since their relatively low volatility substantially decreases the deterioration of the plasticized resin on aging and their relative insensibility to lower temperatures permits the use of the plasticized resins in articles which must be subjected to abnormally low temperatures.

The amount of plasticizer to be used may be varied from about .05 to about 200 parts per 100 parts of vinylidene polymer or copolymer according to particular properties desired in the finished article. It may be incorporated in the resins by any of the conventional methods such as dry mixing at normal temperatures or at elevated temperatures, mixing with a small amount of solvent in dough mixers, adding to dilute solution of the resins in organic solvents, adding to the monomer prior to polymerization especially in emulsion polymerization processes, etc.

Molding powders made from the vinylidene polymer and copolymer resins containing the plasticizers of this invention may be compression or injection molded using the conventional procedures and often at lower and more rapid molding cycles. The compositions may be extruded and otherwise worked by conventional methods.

Various additives such as pigments, dyes, fillers, etc., may be added to the compositions of this invention, often in larger amounts than has heretofore been possible, without embrittlement of the resins.

It is obvious that many variations may be made on the processes and products of this invention without departing from the spirit and scope thereof as defined in the appended claims.

What is claimed is:

1. A composition comprising a vinylidene resin and from 0.05 to 200% by weight of an ether of an alkylol aryl sulfonamide.

2. A composition comprising a vinyl halide resin and from 0.05 to 200% by weight of an ether of an alkylol aryl sulfonamide.

3. A composition as in claim 2 wherein the vinyl halide is vinyl chloride.

4. A composition as in claim 3 wherein the ether is the 2-ethyl hexyl ether of methylol p-toluene sulfonamide.

5. A composition as in claim 3 wherein the ether is the lauryl ether of methylol p-toluene sulfonamide.

6. A composition comprising polymerized styrene and from 0.05 to 200% by weight of an ether of an alkylol aryl sulfonamide.

7. A composition comprising a resinous copolymer of at least two vinylidene compounds and from 0.05 to 200% of an ether of an alkylol aryl sulfonamide.

GEORGE R. SIDO.

REFERENCES CITED

The following references are of record in the file of this patent:

FOREIGN PATENTS

| Number | Country | Date |
|---|---|---|
| 721,717 | France | Dec. 23, 1931 |